United States Patent Office 2,729,633
Patented Jan. 3, 1956

2,729,633

SULFATED PECTIC ACID BLOOD ANTICOAGULANT

Harvey E. Alburn, Springfield Township, Montgomery County, and Joseph Seifter, Philadelphia, Pa., assignors, by mesne assignments, to American Home Products Corporation, New York, N. Y., a corporation of Delaware No Drawing. Application May 13, 1952,
Serial No. 287,608

6 Claims. (Cl. 260—209.5)

This invention relates to sulfated pectic acid compositions, i. e., to pectic acid esters of sulfuric acid and their water-soluble salts. It is also concerned with the utilization of these sulfated, high molecular weight compounds as anticoagulants for preventing the clotting of blood.

Heparin has long been used clinically to prevent the clotting of blood, for example to prevent post-operative thrombosis. When so utilized it is injected intravenously, usually in the form of its sodium salt dissolved in normal saline solution. While heparin possesses strong anticoagulant action combined with relatively low toxicity, and is thus very useful as a blood anticoagulant, it also has the serious disadvantage of being available only in relatively small quantities and at a relatively high price.

Various efforts have been made to find a satisfactory substitute for heparin which would provide a less costly and more generally available blood anticoagulant suitable for clinical use. Efforts have been made to ultilize sulfates of polysaccharides and their derivatives, such as the sulfates of cellulose, chitin and chondroitin, but these attempts have been generally unsuccessful, owing to the lessened potency and greater toxicity of these compounds at given administration levels as compared with heparin. On the other hand, the sulfates of alginic acid, a complex probably built up of mannuronic acid units, and the water-soluble salts of these sulfates, have been found to yield very valuable blood anticoagulants which, while somewhat less potent than heparin, have the very definite advantage of providing more prolonged duration of the anticoagulant effect.

Many substances which may be considered as chemically somewhat similar to heparin have been investigated in an effort to determine whether they would be of value as blood anticoagulants. Among these are sulfated pectin and its water-soluble salts. The pectins, like most natural materials of high molecular weight, do not constitute a single chemical individual, but a mixture of polymers of various molecular weights. While the exact chemical nature of pectin has not been fully elucidated, these polymeric materials are now generally regarded as polygalacturonic or polyanhydrogalacturonic acids with carboxyl groups partially esterified. Thus Karrer, Koenig and Usteri, as reported in the Helvetica Chimica Acta, 26 (1943), pp. 1299–1300, tested a pectin sulfate ester which had one-third the potency of heparin as a blood anticoagulant, but they found it to be ten times as toxic as heparin when compared on a weight-for-weight basis, presumably in the form of their respective sodium salts.

While the absolute toxicity of a blood anticoagulant is not controlling in clinical use or animal experimentation, it is essential that the amount of material administered to produce a required anticoagulant effect should be only a small fraction of a minimum toxic quantity. In view of the fact that the sulfated pectin tested by Karrer and his co-workers was so many times more toxic than heparin, at the same time exhibiting a much inferior anticoagulant activity, the pectin sulfates and their water-soluble salts have generally not been regarded as promising blood anticoagulants for possible clinical use or as potential substitutes for heparin.

In evaluating an anticoagulant, whether intended for clinical or non-clinical use, it is highly desirable that it shall have a prolonged duration of the anticoagulant effect. Where its effectiveness in preventing the clotting of blood is prolonged for a considerable period of time the frequency of its required administration is considerably reduced. For this reason, particularly in the clinical evaluation of blood anticoagulant substances, the duration of its anticoagulant effect is an important property bearing on the usefulness of an anticoagulant compound intended for intravenous injection, which property must be considered in addition to its potency and toxicity.

We have now discovered that, in spite of the unsatisfactory results and general lack of promise of the sulfates of pectin as reported in the literature, it is possible to utilize pectin as a starting material for the production of a very useful anticoagulant for blood. Since pectin is commercially available in large amounts and at relatively low cost, it is an attractive starting material from which to prepare clinically useful substances having blood anticoagulant properties which substances, at the same time, are not unduly toxic.

We have found that if pectin is first treated to hydrolyze and recover pectic acid therefrom, and if this pectic acid is sulfated under the proper conditions and in accordance with our process as hereinafter described, after treatment thereof in order to reduce its molecular weight, valuable blood anticoaguants are secured having prolonged anticlotting activity and a ratio of potency to toxicity such as to permit their safe utilization for both clinical and non-clinical purposes. Pectic acid, i. e. the acid portion of hydrolyzed pectin, is readily available commercially, and may be purchased in any amount. If desired, it may be prepared by various methods, such as by saponification of pectin with alkalis in aqueous solution, followed by precipitation of the pectic acid by dilute hydrochloric acid, washing with solvents and drying. One such method is described by Mottern and Cole, J. A. C. S. 61, 2701 (1939).

We have found that pectic acid, as produced from pectins, must first be treated in order to reduce its molecular weight in order that, when it is sulfated, the resulting product may be useful as a blood anticoagulant, possessing satisfactory activity, relatively low toxicity, and prolonged effectiveness. Pectic acid is easily degraded, its molecular weight being reduced by treatments of various kinds. For example, it may be subjected to the action of heat in the presence of water or other liquid. The heating may advantageously be carried out at a temperature within the range 80–120° C. for a period of time which will, in general, range from about 40 minutes to about 120 minutes. The maintenance of temperatures above 100° C. will require autoclaving the pectic acid, and shorter periods of treatment are ordinarily required at the more elevated temperatures.

In determining a suitable time for the heating, for each 10° C. above, or below, 100° C., the time of heating should be approximately halved or doubled from the general range given (i. e. 40 minutes to 120 minutes) which may be regarded as the preferred time interval when the heating is carried out at about 100° C. When the heat treatment is carried out at 120° C. under some circumstances the period of heating may be as short as about 10 minutes, while at a temperature of about 80° C. heating for as long as about eight hours (480 minutes) may be necessary.

Pectic acid suspended in water may therefore be heated, in accordance with a preferred depolymerization procedure, at 100° C. for a period ranging from about 40 minutes to about 120 minutes. The reduction in viscosity of the degraded or depolymerized pectin is a measure of the degree to which the pectin has been depolymerized.

When a 15% suspension of pectic acid in water is heated for the various periods of time tabulated below, the relative viscosities, as determined after each period of heating, indicate the extent of depolymerization in each case. In determining these relative viscosities the sample of pectic acid which was heated for each of the specified treatment periods was dissolved in 0.1 N sodium hydroxide in sufficient amount to make the concentration of the solution equal to 0.4%, and the viscosities were then run on these solutions. The results were as follows:

| Sample: | Relative viscosity |
|---|---|
| Control (not heated) | 1.372 |
| 30 minutes heating | 1.325 |
| 60 minutes heating | 1.285 |
| 90 minutes heating | 1.238 |
| 120 minutes heating | 1.213 |
| 150 minutes heating | 1.199 |

The pectic acid may be subjected to heat treatment in the form of a water suspension, or by refluxing in a lower alcohol such as methanol or ethanol. It may also be suspended in a salt solution during the process of degradation, solutions of calcium chloride and barium chloride being especially effective for this purpose. Degraded pectic acid of good sulfating properties is also secured by heating in the presence of a mineral acid, such as dilute sulfuric acid or dilute hydrochloric acid, or by heating in the presence of other acids, such as formic acid. Effective depolymerization and desirable sulfated products are secured, for example, by carrying out the degradation at 60-90° C. for a period of time ranging from 30 to 60 minutes in 90% formic acid. When depolymerizing by heating in the presence of an alcohol, such as methanol or ethanol, good results are secured by having an acid such as dry hydrogen chloride present in the alcohol. We have obtained pectic acid of good sulfating properties, and sulfated products of superior blood anticoagulant activity, when the depolymerization is carried out by heating a 10% suspension in methanol containing about 10% dry hydrogen chloride for a period ranging from 12 hours to 16 hours.

Various types of heat treatment are therefore effective in reducing the molecular weight of the pectic acid prior to sulfation, both for the purpose of insuring the introduction of an adequate amount of sulfur into the molecule, and to impart to the resulting sulfated product satisfactory blood anticoagulant activity without too high a degree of toxicity. This heat treatment may be carried out using an aqueous suspension of the pectic acid, or with the pectic acid suspended in alcohols, salt solutions, aqueous alkalis, aqueous acids, methanolic or ethanolic hydrogen chloride, etc.

Various degrees of degradation resulting from variations in the time and temperature of the heating will give, upon sulfation, products of satisfactory sulfur content and effective anticoagulant activity for blood. For the most satisfactory products it may be advisable to avoid depolymerizing to too great an extent. But depolymerization of the pectic acid prior to sulfation of any sort gives usable products having, to a greater or less degree, satisfactory anticoagulant activity and reasonably low toxicity. For this reason we do not wish to be limited to the degree or extent to which the degradation or depolymerization is carried out, or to specific temperature ranges, treatment agents, time periods, etc., except to the extent necessitated by the definition of our invention as given in the appended claims.

While with certain sulfating agents, as, for example, with a cold methyl alcohol solution of sulfuric acid of high concentration, it is possible to introduce adequate amounts of sulfur into the molecule even when the pectic acid has not been degraded by heat treatment, the resulting sulfated products have generally been found to be too toxic to permit of their clinical use. In this connection, see Karrer et al., Helvetica Chimica Acta, 26, pages 1299–1300 (1943).

In sulfating the pectic acid of reduced molecular weight we prefer to use a halo-sulfonic acid, such as chlorosulfonic acid, in the presence of an anhydrous acid acceptor such as pyridine. Substantially anhydrous pyridine, i. e. pyridine of relatively very low moisture content, should be employed. If necessary, the pectic acid may first be dried by treatment with a drying agent such as phosphorus pentoxide or calcium chloride, preferably at a temperature of 50–70° C. The sulfation is readily carried out at moderate temperatures, such as at temperatures within the range room temperature up to about 80° C.

Other known sulfating procedures can also be used, such as by treating the pectic acid at room temperature, or at a moderately elevated temperature, with methanolic or ethanolic sulfuric acid. Esterification of a large fraction of the free hydroxyl groups of the pectic acid to form sulfate groups occurs upon sulfation, with the introduction of a quantity of sulfur approaching the theoretical amount possible of introduction, without danger of further polymerization of the partially depolymerized pectic acid.

In preparing water-soluble salts of sulfated pectic acid of reduced molecular weight, the degraded pectic acid may be sulfated with a halo-sulfonic acid, such as chlorosulfonic acid, in the presence of pyridine. The pyridinium salt thus formed is dissolved in water, and the pH of the solution adjusted within the range 7–9 by the addition of aqueous sodium hydroxide solution. Upon the addition of acetone or alcohol, the sodium salt of sulfated pectic acid is precipitated, the pyridine being liberated and remaining in solution.

In place of aqueous sodium hydroxide, other aqueous bases may be used, thereby obtaining other metal salts of sulfated pectic acid. Other alkali metal salts, including the ammonium salt, and alkaline earth metal salts, such as the calcium salt, are readily prepared in this way.

As an alternative procedure, the pyridinium salt may be converted to the free ester by treatment in aqueous solution with an ion exchange resin on the hydrogen cycle. Desired salts may then be formed by the addition of an excess of a soluble salt of the particular metal of which the sulfated pectic acid salt is desired. The water-soluble salts thus produced possess the desired anticoagulant activity for blood.

Organic salts can be formed similarly by first preparing the free sulfated pectic acid ester by use of an ion exchange resin. The desired organic compound is then reacted with the free ester. For example, the N,N'-dibenzyl-piperazine salt of sulfated pectic acid can be prepared in this way. Those non-toxic salts of sulfated pectic acid of reduced molecular weight which are soluble in water are valuable anticoagulants for blood.

Ordinarily we prefer to introduce into the pectic acid an amount of sulfur falling within the range 10% to 16% by weight, as these sulfated products are characterized by high pharmacological activity, and toxicity so low that they may be safely used in effective dosages. Since from 14% to 16% of sulfur can be introduced into degraded pectic acid without too much difficulty, and greater blood anticoagulant activity generally results with increased sulfur content, our preferred products will generally contain the higher percentages of sulfur. The theoretical sulfur content of pectic acid monosulfate disodium salt is 10.68%, while that of the disulfate trisodium salt is 15.94%, and a sulfur content somewhere between these values will generally provide the most satisfactory blood anticoagulants for general medical use.

The following examples are illustrative of our invention:

Example 1

Pectic acid without preliminary treatment in order to reduce its molecular weight was sulfated, utilizing chlorosulfonic acid and pyridine. The resulting product was fractionated by the addition of water, those fractions higher in sulfur content being more readily soluble in water than those lower in sulfur content. The most water-soluble fraction recovered had a sulfur content of only 5.24%, while the least soluble fraction had a sulfur content of 2.62%. In neither case did the resulting sulfated product exhibit effective blood anticoagulant activity.

Example 2

Pectic acid, without preliminary reduction of its molecular weight, was sulfated by treatment with a methanolic acid solution of sulfuric acid at room temperature. The resulting product was dialyzed through a semi-permeable membrane to remove salts and pectic acid sulfate of lower molecular weight. The higher molecular weight sulfated pectic acid within the semi-permeable membrane was retained. It was a water-soluble product containing 14.56% of sulfur. However, the toxicity of this product was such as to render it unsatisfactory for clinical use as a blood anticoagulant.

Example 3

Sixty grams of depolymerized pectic acid was dried at 60° C. in a vacuum oven over phosphorus pentoxide to a moisture content of about 1%.

Twelve hundred ml. of pyridine containing not more than 0.4% water was placed in a flask and stirred while 260 ml. of chlorosulfonic acid was added with cooling. Fifty-five grams of the dried pectic acid was then added, and the mixture stirred for 1 hr. at a temperature of 75–80° C. The mixture was poured into 1.5 liters of cracked ice and water. The solution was filtered and mixed with 4 volumes of 95% ethanol. The resulting precipitate of pectic acid sulfate pyridinium salt was washed with ethanol and acetone. It was then stirred with 1.5 liters of 1:1 water-acetone for 1 hr., centrifuged and supernatant solution brought to pH 7.5 with sodium hydroxide solution. Four volumes of acetone were added, and the resulting precipitate of pectic acid sulfate sodium salt was collected and dried. The yield was 57 grams.

The product was effective as a blood anticoagulant, and its toxicity was not excessive.

Example 4

A quantity of pectic acid was first treated to reduce its molecular weight by heating it at the boiling point in contact with water for 22.5 minutes. It was then sulfated by treatment with chlorosulfonic acid-pyridine at a moderately elevated temperature. The pyridine was a commercially available pyridine of less than about 0.4% moisture content. The resulting sulfated product contained 15.03% of sulfur and 15.15% of sodium.

When tested by intravenous injection in rabbits, in the amount of 5 milligrams per kilogram of rabbit weight, the duration of the anticoagulant activity was found to be 180 minutes. The $LD_{50}$ dose (dose required to kill 50% of the animals) when tested on mice was found to be below 1400 milligrams per kilogram.

Example 5

Pectic acid was degraded for forty minutes by heating in contact with water at 100° C. The product of reduced molecular weight was then sulfated by treatment with chlorosulfonic acid-pyridine at a moderately elevated temperature. The resulting sulfated product contained 14.62% of sulfur and 13.71% of sodium.

When tested for its blood anticoagulant activity in rabbits, the sulfated product was found to be effective for a period of about 270 minutes. The $LD_{50}$ dose for mice was found to be slightly below 1,000 milligrams per kilogram. The sulfated product appeared to be less toxic than the product prepared in accordance with the procedure of Example 4, since the mice died less quickly.

Example 6

Pectic acid was degraded for 1 hr. at 100° C. in calcium chloride solution. Fifty-five grams of the degraded pectic acid was then sulfated with chlorosulfonic acid. The 57 g. of crude sodium salt was then separated into three fractions by fractional precipitation from aqueous solution with ethylene glycol containing sodium chloride. Fraction A, with the highest molecular weight, had a relative viscosity of 2.853 as a 5% solution in 0.5 M sodium chloride solution. Fraction B had a relative viscosity of 2.261 and a sulfur content of 14.88%. On intravenous injection in rabbits at 5 mg./kg. fraction B was very active, giving a duration of anticoagulant activity of 240 min. The $LD_{50}$ in mice was less than 1000 mg./kg. Fraction C had a relative viscosity of 1.204 and a sulfur content of 14.95%. The duration of activity in rabbits was 180 min. and the $LD_{50}$ was 1000 mg./kg.

Modifications may be made in carrying out this invention without departing from the spirit and scope thereof, and the invention is to be limited in scope only by the appended claims.

We claim:

1. The method of producing degraded pectic acid sulfates which comprises degrading pectic acid by treatment thereof at an elevated temperature within the range 80–120° C. for a period ranging from about 10 minutes to about eight hours, and then sulfating said degraded pectic acid by treatment thereof with a halosulfonic acid in the presence of pyridine as an acid acceptor.

2. The method of producing degraded pectic acid sulfates which comprises degrading pectic acid by treatment thereof at a temperature of approximately 100° C. for a period of time ranging from about 40 minutes to about 120 minutes, and then sulfating said degraded pectic acid by treatment thereof with a halosulfonic acid in the presence of pyridine as an acid acceptor.

3. The method of producing degraded pectic acid sulfates which comprises degrading pectic acid by treatment thereof at approximately 120° C. for a period of about 10 minutes, and then sulfating said degraded pectic acid by treatment thereof with a halosulfonic acid in the presence of pyridine as an acid acceptor.

4. The method of producing degraded pectic acid sulfates which comprises degrading pectic acid by treatment thereof at a temperature of approximately 80° C. for a period of time ranging up to about 8 hours, and then sulfating said degraded pectic acid by treatment thereof with a halosulfonic acid in the presence of pyridine as an acid acceptor.

5. Pectic acid sulfate compounds selected from the class consisting of sulfates of degraded pectic acid and water-soluble salts thereof, said compounds having been prepared by degrading pectic acid by treatment thereof at an elevated temperature within the range 80–120° C. for a period ranging from about 10 minutes to about 8 hours, and then sulfating said degraded pectic acid.

6. Pectic acid sulfate compounds selected from the class consisting of sulfates of degraded pectic acid and water-soluble salts thereof, said compounds having been prepared by degrading pectic acid by treatment thereof at an elevated temperature within the range 80–120° C. for a period ranging from about 10 minutes to about 8 hours, and then sulfating said degraded pectic acid by treatment thereof with a halosulfonic acid in the presence of pyridine as an acid acceptor.

(References on following page)

References Cited in the file of this patent

UNITED STATES PATENTS

| | | |
|---|---|---|
| 2,508,433 | Snyder | May 23, 1950 |
| 2,599,564 | Lee et al. | June 10, 1952 |
| 2,612,498 | Alburn | Sept. 30, 1952 |

FOREIGN PATENTS

| | | |
|---|---|---|
| 603,571 | Great Britain | June 18, 1948 |

OTHER REFERENCES

Karrer et al.: Chem. Abs. 38, 2933 (1944).
Von Kaulla et al.: Chem. Abs. 44, 3914 (1950).